United States Patent Office 3,422,026
Patented Jan. 14, 1969

3,422,026
BITUMINOUS PAVING EMULSIONS
James R. Wright, Bethesda, Md., assignor to Chevron Research Company, San Francisco, Calif., a corporation of Delaware
No Drawing. Continuation-in-part of application Ser. No. 103,823, Apr. 18, 1961. This application Apr. 6, 1965, Ser. No. 446,118
U.S. Cl. 252—311.5     2 Claims
Int. Cl. B01j 13/00; C09d 3/24

ABSTRACT OF THE DISCLOSURE

An oil-in-water type paving emulsion of 50 to 75% by weight of asphalt emulsified in water with the aid of a combination of cation-active and ampholytic emulsifiers, wherein from 0.025 to 0.25% by weight is an ampholytic emulsifier whose isoelectric point lies on the acid side of the neutral point. The pH of the emulsion is on the acid side, and the ampholytic component of the emulsifier combination contains at least one aliphatic $C_8$–$C_{24}$ hydrocarbon chain, and at least one basic nitrogen atom, and at least one acid radical.

---

The present invention relates to aqueous bituminous emulsions suitable for seal-coating work in the construction and repair of roads, aerodromes and other ground surfaces, and more particularly it relates to oil-in-water type asphalt emulsions suitable for the aforementioned coating applications.

This application is a continuation-in-part of my copending application Ser. No. 103,823, filed Apr. 18, 1961 and presently abandoned.

Anionic bituminous emulsions available on the market for various road-paving uses ordinarily are prepared by heating a bitumen, such as asphalt, to a liquid state and then thoroughly agitating it with hot water in the presence of an anion-active emulsifier dissolved in the water as such, or yet formed in situ in the course of agitation, owing to the addition to the water-asphalt mixture of an alkaline base which reacts with the acid constituents of the asphalt.

Cationic bituminous emulsions, e.g., asphalt-in-water emulsions, more recently introduced on the market, are formed by a similar agitation of melted asphalt with water with the aid of cation-active emulsifiers which are either dissolved in the water employed for emulsification, or are dispersed in the asphalt phase before the emulsification, or yet emulsification may be carried out in situ, treating the asphalt with a base, such as an amine, and then dispersing the treated asphalt in a dilute solution of a water-soluble acid, such as hydrochloric.

Many factors are apt to influence the success of application of bituminous emulsions in paving work, one of the most important being the nature of the stone aggregate with which the emulsion is being mixed, or on which it is applied, on the job. When electro-positive aggregates, such as dolomite or limestone, are not available, and siliceous materials, such as quartz or sandstone chips, sand, and the like, are to be used instead, anionic emulsions do not provide an adequate coating of the aggregate, and the reulting paved surface lacks stability and strength and fails to endure. Conversely, cationic emulsions generally are ineffective on dolomite, limestone, and like stone aggregates.

Consequently, production of aqueous bituminous emulsions and, in particular, of asphalt-in-water paving emulsions, such as seal coat emulsions, mixing-grade emulsions, and the like, which would within a fixed pH range be capable of coating satisfactorily both kinds of stone aggregates, the electro-positive and the electro-negative, as well as the aggregates of a mixed type (carrying both positive and negative surface charges), appeared heretofore to be a desirable, however, practically unattainable ideal.

I have now found that bituminous emulsions of such ambivalent character, that is, emulsions which provide an effective coating of the bituminous binder on either electro-negative or electro-positive stone aggregates can be readily prepared by using for the purpose a surface-active ampholytic or amphoteric material which effectively emulsifies bitumen in water. The resulting emulsions are sufficiently stable in storage and for handling prior to actual use, and furnish an adequate coating of the bituminous or asphaltic binder on stone aggregate, irrespective of the electric charges on the surface of the latter, provided the pH of these emulsions lies in the particular operative range which will be described hereinafter.

Particularly effective and, accordingly, preferred are those ampholytic materials (ampholytes) whose isoelectric point lies on the acid side of the neutral point (pH=7.0). By adjusting and maintaining the pH of the emulsions formulated with the aid of such ampholytes to a value that is less than about pH=7.0, one is enabled to obtain an effective coating of bitumen (asphalt) on either a siliceous (electro-negative) or a limestone (electro-negative) aggregate.

The pH of the emulsifying water may be adjusted in advance, prior to emulsification, with the aid of either an acid or a base, to provide to the finished emulsion a pH that would permit effective coating of stone aggregates.

The operative and, accordingly, preferred pH range of the emulsions of my invention can extend from a value differing by about 0.25 pH units (+ or −) from the value, in pH units, of the isoelectric point of a given ampholytic emulsifier, which has its isoelectric point on the acid side, to a value which is less than pH=7.0 and may be located as far as 3 pH units on either side of the isoelectric point of the ampholyte. Within this range of pH values, the emulsion can be used to obtain satisfactory coatings of either electro-negative or electro-positive aggregates. Preferably, the pH of the emulsion should lie within the range of values extending about 2.5 pH units on both sides of the isoelectric point of a given ampholytic emulsifier, but should not exceed pH=7.0.

The segment of the pH range extending 0.25 pH units on each side of the isoelectric point corresponds to that portion of the pH range where the ampholyte is present predominantly in the zwitter-ion form, the isoelectric point corresponding to the exact electrical neutrality (the number of anions being equal to the number of cations). This segment may be designated as the isoelectric range of the ampholyte.

Suppose, as an illustration, that, in accordance with the preferred aspect of my invention, an ampholyte has an isoelectric point on the acid side of the neutral point. At the isoelectric point and close to it, the electrophoretic mobility is substantially nil, the concentrations of positively charged and negatively charged ions being virtually equal. Beyond this narrow segment of electrophoretic inactivity (the so-called "isoelectric range"), which usually does not extend more than about 0.25 pH units on either side of the isoelectric point, and for as much as about 3.0 pH units, preferably about 2.5 pH units away from that point, so long as the pH of the emulsion of bitumen is on the acid side of the neutral point, the presence of comparatively high concentrations of both positively and negatively charged ions of the ampholyte in this emulsion of bitumen in water permits effective coating of oppositely charged stone aggregates.

When the surface-active ampholytic materials suitable for the preparation of the bituminous emulsions of the present invention are used as the sole emulsifiers to effectuate the emulsification of bitumen in water, their amounts may range from about 0.15% to about 1.5%, and preferably from about 0.25% to about 1.0% (undiluted) by weight of the finished emulsion.

Particularly suitable and effective emulsifiers for preparing asphalt-in-water emulsions of the present invention are those surface-active ampholytes having their isoelectric point on the acid side of the neutral point, whose molecules are characterized by the presence of at least one aliphatic hydrocarbon chain of from 8 to 36 carbon atoms, preferably of from 8 to 4 carbon atoms, at least one basic nitrogen and at least one acid radical.

The basic nitrogen which must be present in the molecule of an ampholytic emulsifier effective according to the present invention may be either in the form of a quaternary or a non-quaternary nitrogen, for instance, a nitrogen of an ammonium, pyridinium, imidazolinium or amine group.

As illustrations of such suitable ampholytic emulsifiers, there may be mentioned, as particularly effective, higher $C_8$–$C_{24}$-alkylamino carboxylic acids and their water-soluble salts, such as N-dodecyl-beta-imino-dipropionic acid, N-stearyl-beta-iminodiacetic acid, N-octadecenylaminopropionic acid, N-hexadecylaminoacetic acid; also higher alkyl betaines, such as those in which the long-chain hydrocarbon group is attached to the carbon atom as, for example, in C-cetyl betaine represented by the formula:

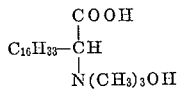

Among the commercially available ampholytic surface-active materials which may be used to prepare asphalt and like bitumens in accordance with the invention, there may be mentioned:

(1) The various N-substituted aminocarboxylic acid derivatives obtained by the condensation of fatty primary amines and acrylic monomers. These derivatives are sold to the trade under the generic designation of "Deriphats." Among these, N-fatty-beta-aminopropionates (Deriphats 151 and 170C) and N-fatty-beta-iminodipropionates (Deriphats 154 and 160C) are particularly effective for the purposes of this invention.

(2) The material known in the trade under the designation of "BCO," a product of E. I. du Pont de Nemours & Co. (Inc.); it is a betaine corresponding to the formula of C-cetyl betaine given hereinabove.

(3) The several "Miranols" forming a group of trademarked materials which correspond to the general structural formula of:

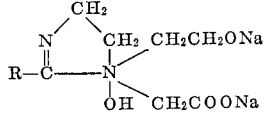

in which R is a long hydrocarbon chain, for instance, a lauryl or an oleyl radical.

Ampholytic non-nitrogenous surfactants which contain sulfonium or phosphonium groups and have their isoelectric points on the acid side of the neutral point are similarly effective as emulsifiers for bitumen and improve the stone-coating property of the corresponding bituminous emulsions. An example of such a surfactants is thetine, described in U.S. Patent No. 2,178,353, issued to Werntz, and other like compounds. However, in view of their lower cost and availability, nitrogen-containing ampholytes are at present preferred.

Any bitumen capable of being emulsified in water with the aid of ampholytic materials of the kind described may be employed for preparing emulsions which will effectively coat both the electro-positive and the electro-negative stone aggregates in conformity with the principle of the invention. Asphalts are particularly suitable for the purpose, including both natural asphalts and refined asphalts, e.g., steam-refined asphalts, and the like. The asphalt-in-water emulsions prepared with the ampholytic emulsifiers in accordance with the invention may be of either the rapid-setting, medium-setting or slow-setting type. They contain from about 50 to about 75% by weight of asphalt, preferably from about 55% to about 70% by weight of asphalt, the balance to make up 100% by weight of the total emulsion being water and the emulsifier. This latter is used, as indicated before, in amounts which may range from about 0.15% to about 1.5% by weight, and preferably from about 0.25 to about 1.0% (undiluted) by weight of the finished emulsion.

In addition, I wish to emphasize at this point that so long as at least 0.025% by weight of the ampholytic surfactant is present in the emulsifier used for the emulsification of asphalt and similar bitumens, the resulting paving emulsions will provide a satisfactory coating of the bituminous binder on the aggregate. In fact, as much as about 85% of the surface-active material necessary to emulsify the asphalt may be provided by cation-active quaternary ammonium halide salts (preferably chlorides) of certain fatty amines and polyethoxylated fatty amines. This permits reducing the quantity of the usually costlier ampholytic component by replacing it with a cheaper material, for instance, a cationic $C_{14}$–$C_{18}$ alkyl trimethyl ammonium compound sold under the trademark "Arquad" or with a likewise cationic polyethoxylated quaternary ammonium compound sold under the trademark "Ethoquad." While thus securing a substantial reduction in the cost of the final paving emulsion, the presence of the ampholytic material, even though in small amounts from at least 0.025% by weight to about 0.25% by weight, in the total emulsifier combination still insures the desired "amphoteric" effect, enabling the coating of both electropositive and electro-negative aggregates in accordance with the invention.

Very effective and, therefore, satisfactory combinations of an ampholytic material with another emulsifier according to my invention are those which use an ampholyte, such as a "Deriphat," "BCO," oor a "Miranol," and a polyethoxylated quaternary ammonium compound having one long alkyl group derived from $C_{12}$–$C_{22}$ fatty acids on the quaternary nitrogen, and also having a total of oxyethylene units which may range from 2 to 50. The weight ratio of the ampholyte to the polyethoxylated compound may be from about 1:6 to about 1:4 (based on 100% active materials). The polyethoxylated quaternary ammonium compounds referred to hereinbefore are available, for instance, in the trade under the trademark "Ethoquad" and have the following general structure:

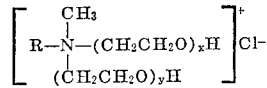

in which R is a long alkyl chain derived from oleic, stearic or coco fatty acids and the sum of $x$ and $y$ can be from 2 to 15.

Very satisfactory results of coating the aggregate have been obtained with bituminous (asphalt) emulsions prepared with the aid of the combinations of ampholytes, such as "Deriphat 160C" and "Deriphat 161," with the cationic salts of polyethoxylated quaternary ammonium materials sold under the trademark designations of "Ethoquad 18/12," "Ethoquad C/12" and "Ethoquad O/12." In this last-named material, the long alkyl chain is derived from oleic acid, and it contains two mols of ethylene oxide, the preferred weight ratio of the ampholyte ("Deriphat 160C") to this particular "Ethoquad" being from about 1 to about 5 (based on 100% active materials).

No special technique is required for carrying out the emulsification, except that the pH of the aqueous phase of the emulsion is selected beforehand, so that the pH of the final emulsion would lie within the operative range on each side of the isoelectric point of the particular ampholytic emulsifier, excluding the short segment of isoelectric range. For this purpose, addition of a suitable amount of an acid or of a base may be necessary.

The resulting asphalt emulsions may be employed for all kinds of seal coat treatments, for base stabilization work and for the preparation of mixes with sand and the like stone aggregates to be used in paving.

Whenever desired, conventional additives known in the art of bituminous emulsions may be incorporated in the emulsions in order to improve certain desirable properties thereof. These additives include, for instance, anti-stripping agents, thickening agents, compounds which modify (lower) the emulsion viscosity, such as sodium acetate (in amounts from about 0.10 to about 0.25% by weight), and additives which facilitate mixing with the aggregate, etc., the sole condition being that the presence of these additives would not affect adversely the beneficial characteristics brought about by the use of ampholytic emulsifiers. Likewise, addition of conventional hydrocarbon cutter stocks, such as naphtha, and in such amounts as would not interfere with the operativeness and quality of the emulsions, is also contemplated within the scope of the present invention.

In addition, the application of ampholytic compounds in conjunction with the cationic emulsifying quaternary salts of fatty amines and polyethoxylated fatty amines, such as "Arquads" and "Ethoquads" for the preparation of asphalt-in-water emulsions for use in paving work according to the present invention offers an unexpected solution to the problem of securing satisfactory emulsion-sand mixes. Heretofore satisfactory mixes of cationic emulsions with sand were difficult to obtain, particularly when the sand contained any appreciable proportion of fines. Probably, this was due to the fact that cation-active materials are strongly attracted to hydrophilic sand particles and that, accordingly, the emulsion becomes prematurely destabilized (breaks too fast), while being mixed with sand. Also, it may well be that the cause of inadequate coating is the large total surface area of the particles of sand and their slickness, or yet the presence of appreciable amounts of fines may be the cause, or all of these factors together may contribute to premature breakdown and insufficient coating.

Particularly, when a combination of one of the aforementioned "Deriphats," e.g., "Deriphat 160C," "Deriphat 161" or "Deriphat 170C," with one of the "Ethoquads," preferably "Ethoquad O/12," is used for the preparation of emulsions of bitumen, the mixes of such emulsions with sand in the conventional proportions of the paving practice (5 to 10% by weight of the emulsion) unexpectedly display a highly satisfactory coating of the particles, so that not less than 75% of the surface thereof becomes coated with the bituminous binder from the emulsion.

For the purpose of illustrating the advantages of the emulsions prepared with ampholytic emulsifiers as described hereinabove, and in order to confirm the effectiveness of these emulsions on stone aggregates bearing opposite electrical charges, numerous tests have been conducted, and some of the representative results of these tests are being offered hereinafter.

A number of emulsions have been prepared using two different kinds of asphalt, asphalt A having substantially no inherent acidity, and asphalt B, the acid value of which ranged from about 1.0 to about 1.5 The emulsions had an asphalt content from about 62% to about 65% by weight. In this first series of tests, three ampholytic emulsifiers were employed: the amphoteric surfactant BCO (C-cetyl betaine) referred to hereinbefore which is a "balanced" ampholyte, i.e., one in which the number of acidic groups equals the number of basic groups; also, two "Deriphats" of the trade, namely, Deriphat 151 which is sodium N-coco-beta-aminopropionate, likewise a balanced ampholyte, and Deriphat 154 which is disodium N-tallow-beta-iminodipropionate, an "unbalanced" ampholyte containing two carboxylic acid groups and one amine group. The prefixes "coco" and "tallow" indicate the presence of hydrocarbon (alkyl) radicals derived from coconut oil and animal tallow, respectively. The isoelectric point of each ampholyte was obtained by known titration techniques. Where the ampholyte is too sensitive to small amounts of acid or base, the paper strip electrophoresis method or microelectrophoretic mobility method may be substituted with success.

The pH of Deriphats in water solution is strongly alkaline (of the order of 11.0 pH units), and it was therefore necessary to adjust the pH of the emulsifying water in their tests by the addition of an acid, preferably HCl.

Viscosity of each emulsion in seconds at 122° F. was measured in a known manner (ASTM Method D244) in a Saybolt-Furol viscometer.

Effective coating of different stone aggregates was established by employing a special stone coating-water resistance testing technique, as follows:

465 g. of the aggregate washed, dried and graded to pass a ⅜" screen and be retained on a No. 4 screen, was weighed into a metal pan about 8" in diameter and 3" deep. Water in an amount of 9.3 g. was added into the pan and mixed with a mixing spoon until uniformly dispersed. Then 35 g. of the emulsion was weighed in the same pan and mixed with the stone aggregate, until this latter became completely coated. The mix was allowed to cure in the pan for thirty minutes at room temperature. After this cure and without remixing, the mixture was washed in the pan with cold tap water until the overflow water ran clear. The excess water was drained off and the mixture placed on absorbent paper for visual evaluation of the extent of coating of the stone surface. For seal coat work, coating of at least 75% of the surface is satisfactory. Coating to the extent of 90% and higher is considered to be excellent. In base stabilization work, the requirements are ordinarily less stringent and coating effectiveness of 50% may sometimes be considered acceptable, depending on the nature of the aggregate (its size and shape), compactness of the base, etc.

The pH of the emulsions was adjusted below the neutral point (pH=7.0) but above the isoelectric range, except, of course, in the case of two emulsions, an anionic and a cationic one, used for the purpose of comparison. The anionic emulsion was prepared by employing an anion-active potassium soap of tall oil acids as the emulsifier, while the cationic emulsion was prepared with the aid of a cation-active emulsifier, namely, the $C_{14}$–$C_{18}$-alkyl trimethyl ammonium chloride, sold in the trade under the trademark "Arquad T." The results of this first series of tests are assembled in Table I below.

TABLE I

| Run Number | Emulsifier Name | Amt. in Weight Percent | I.E.P. in pH Units | pH of Emulsifying Water | Asphalt Type | Amt. in Weight Percent | Visc. in SSF at 122° F. | Extent of Coating (Estimated in percent) | | | | |
|---|---|---|---|---|---|---|---|---|---|---|---|---|
| | | | | | | | | Sandstone | Limestone | Siliceous Gravel | Dolomite | Sand |
| 1 | BCO | 0.5 | 3.5 | 3.0 | A | 65 | 230 | 85 | 80 | | | |
| 2 | BCO | 0.5 | 3.5 | 10.0 | A | 65 | 245 | 40 | 70 | | | |
| 3 | Deriphat 154 | 0.156 | 4.35 | 5.5 | B | 62 | 169 | | | 90 | 80 | |
| 4 | do | 0.156 | 4.35 | 10.0 | B | 62 | | | | 15 | 85 | |
| 5 | do | 0.156 | 4.35 | 3.0 | B | 62 | 225 | | | | 75 | 95+ |
| 6 | Deriphat 151 | 0.30 | 4.25 | 5.5 | B | 65 | | | | * 90+ | * 90 | |
| 7 | do | 0.208 | 4.25 | 5.5 | B | 62 | 39 | | | | 95+ | 90+ |
| 8 | do | 0.208 | 4.25 | 6.5 | B | 62 | 69 | | | | 95 | 95 |
| 9 | Arquad T | 0.30 | | 5.5 | B | 62 | 698 | | 25 | | | 95+ |
| 10 | Potassium Tall Oil Soap | 1.00 | | ca. 10.0 | B | 65 | | | 90+ | | | 5 |

*Mixing time in the Stone-Coating Test was>120 sec. on sand and 110 sec. on Dolomite; in this test, 3% of naphtha cutter was added to preformed mulsion.

It is apparent from the data in Table I that the use of ampholytic emulsifiers in accordance with the invention enables production of satisfactory coatings of asphalt on either the siliceous-type or the limestone-type aggregates (Run 1). When the pH of the emulsion is higher than the value of the isoelectric point plus 3.0 pH units, an adequate coating is no longer obtained (Run 2, result on sandstone and Run 4, result on siliceous gravel). The runs which employ emulsions prepared with ampholytic emulsifiers in accordance with the invention, namely, Runs 1, 3, and 5 to 8 inclusive, clearly demonstrate the effectiveness of these emulsions in coating both the electro-negative and the electro-positive stone aggregates. By contrast, the cationic emulsion applied on limestone (Run 9) preformed very poorly, only 25% of the surface becoming coated, while the anionic emulsion employed on hydrophilic sand aggregate (Run 10) failed almost completely, only 5% of the surface becoming coated.

In Table II, there are presented results of another series of test runs with emulsions prepared using the ampholytic emulsifiers of the invention on opposite types of stone aggregates (limestone and silica). The data in this table again illustrate the advantages achieved by the invention. The same two asphalts A and B have been employed in this series, the asphalt content of the final emulsion varying from about 62% to about 66% by weight.

Representative ampholytic emulsifiers were employed to make the emulsions. These emulsifiers included several Deriphats and Miranols described hereinbefore. Effectiveness of the emulsions in coating stone aggregates has been again compared with a typical anionic and a typical cationic emulsion. The procedures were the same employed in the tests carried out to obtain the data shown in Table I.

cosity, and 0.05% of hydrochloric acid (20° Bé.), the acid being used to fix the pH of the emulsion at about 6.6.

The emulsion was then mixed with a rather difficult-to-coat sand which contained fines and some organic matter and was obtained from Dauphin Island in Alabama. The testing was done by the so-called "Pan and Spoon Method" in conformance with the following procedure: 100 g. of sand dried in an electric oven at 140° F. received an addition of 5 g. of distilled water to simulate the average moisture content observed in dry sand. Then the emulsion, containing, if desired, additional water or cutter stock (naphtha or the like) was added to the sand and mixed thoroughly therewith for about five minutes in a 16-ounce can, using a tablespoon to achieve complete coating of the sand. Immediately thereafter, the mix was held under a stream of water from the laboratory tap until the water ran clear. The percentage of the bituminous binder which did not wash off from the surface of the sand was then estimated visually. Table III presents the results of three such tests.

TABLE III

| Test | Composition of Mix | Coating Quality | Estimated Coverage in percent |
|---|---|---|---|
| A | 8% emulsion, 5% water added | Very good to excellent. | 90-95 |
| B | 8% emulsion, 5% water, 5% naphtha. | Excellent | 95+ |
| C | 10% emulsion, 10% water | Very good | 90 |

TABLE II

| Run Number | Emulsifier Name | Amt. in Weight Percent | I.E.P. in pH Units | pH of Emulsifying Water | Asphalt Type | Amt. in Percent | Visc. in SSF at 122° F. | Extent of Coating (Estimated in Percent) Limestone | Silica |
|---|---|---|---|---|---|---|---|---|---|
| 1 | Deriphat 151 | 0.36 | 4.25 | 1.6 | B | 65 | | 95+ | 95+ |
| 2 | Deriphat 154 | 0.208 | 4.35 | 5.5 | B | 62 | 60 | 85 | 75 |
| 3 | Deriphat 151 | 0.416 | 4.25 | 5.5 | B | 65 | 210 | 70 | 75 |
| 4 | do | 0.312 | 4.25 | 5.5 | B | 65 | 168 | 80 | 90 |
| 5 | Deriphat 160C** | 0.666 | 4.25 | 5.5 | B | 62 | 75 | 85 | 60 |
| 6 | Miranol OM-SF* | 0.66 | 5.1 | 2.0 | A | 65 | 65 | 80 | 85 |
| 7 | do | 0.66 | 5.1 | 3.0 | A | 65 | 75 | 70 | 90 |
| 8 | do | 0.66 | 5.1 | 8.0 | A | 65 | 70 | 65+ | 85 |
| 9 | do | 0.66 | 5.1 | 7.0 | A | 65 | 105 | 65 | 75 |
| 10 | Deriphat 151 / Arquad T | 0.052 / 0.30 | 4.25 | 5.5 | B | 62 | 185 | 90 | 95 |
| 11 | Deriphat 160C / Arquad T | 0.5 / 0.1 | 4.25 | 6.5 | B | 62 | 127 | 80 | 95+ |
| 12 | Deriphat 151 | 0.312 | 4.25 | 7.5 | B | 65 | | 85+ | 55 |
| 13 | Arquad T | 0.30 | | 5.5 | B | 62 | 698 | 25 | 95+ |
| 14 | Potassium Tall Oil Soap | 1.00 | | 10.0 | B | 65 | | 90+ | 5 |
| 15 | Deriphat 154 / Arquad T | 0.052 / 0.2 | 4.35 | 5.5 | B | 62 | 410 | 75 | 90+ |

*Miranol OM-SF is a trademarked designation for the concentrate of one of the "Miranols" referred to hereinbefore, in the general formula of which the radical R is a hydrocarbon radical derived from oleic acid.
**Deriphat 160C is a partial sodium salt of N-lauryliminodipropionate.

The results in Table II again clearly demonstrate the operativeness of the asphalt-in-water emulsions prepared with ampholytic emulsifiers in accordance with the invention. In addition, the data of Runs 10, 11 and 15 confirm the fact that combining ampholytic emulsifiers with cationic emulsifier does not nullify the desired "amphoteric" effect of the ampholyte component.

The effectiveness of ampholytic compounds when used in combination with cationic emulsifiers to make bituminous emulsions according to the invention, for the purpose of preparing paving mixes with sand, is illustrated by the following series of tests.

An emulsion was prepared by emulsifying 68% by weight of a Venezuelan asphalt ($150/200$ Penetration) in water, using 0.7%, based on the weight of the final emulsion, of "Ethoquad O/12," and 0.2% of "Deriphat 160C." In addition, the emulsion contained 0.2% by weight of anhydrous sodium acetate to reduce the vis- In another series of tests the emulsion had the following composition: 68% of the same Venezuelan asphalt as in the emulsion of Table III, 0.5% of "Ethoquad O/12," 0.2% of "Deriphat 160C," 0.15% of anhydrous sodium acetate and enough hydrochloric acid to bring the pH down from 6.8 to 5.0. Amounts equal to 8 and 10%, respectively, of this emulsion were used for mixing with the sand, which was a sand of Maryland origin containing about 2% of fines and 5% moisture. The mixing was carried out in a pug mill, and a 100-gallon batch of emulsion was used in making the sand mix laid on a pavement test strip exposed to considerable truck traffic. The coating of sand was found to be good (80 to 90%). Admixture of from 5 to 10% of cutter stock (naphtha) in the emulsifying water appeared to have no adverse effect on the coating performance. Although, immediately following the placing of this sand mix, it rained, no washoff was observed.

Still in another series of emulsion-sand mixes, the emulsion composition was 68% of a Venezuelan asphalt with a penetration value equal to 193; 0.7% of "Ethoquad O/12," 0.28% of "Deriphat 160C," and 0.049% of hydrochloric acid (20° Bé.), the balance to 100% by weight being water. The emulsion, in addition, received 10% of naphtha and had a pH of 5.5. The samples for testing emulsion-sand mixes were prepared by mixing together for five minutes 100 g. of sand and 10 g. of the emulsion plus 5 g. of water. The sand was a typical fine sand of Minnesota origin. When the coating was observed, after the sample was first cooled for thirty minutes and then washed, it appeared to be excellent in texture and was estimated to cover more than 90% of the surface of sand particles.

In still another series of tests, the emulsion was prepared using again 68% of a Venzuelan asphalt (Penetration 200), emulsified in water with 0.5% of "Ethoquad O/12" and 0.2% of "Deriphat 160C." Additionally, it contained 0.15% of sodium acetate and 0.038% of hydrochloric acid, the balance (31.11%) being water. The pH of this emulsion was 5.7. When mixes with sands of Florida and Alabama origin were prepared, good coating was observed, estimated to cover from 75 to 90% of the sand surface.

Thus, as shown in the preceding description and experimental test data, the invention permits of providing the paving industry with a versatile type of emulsion which can be used satisfactorily to coat different stone aggregates (different as regards the electric charges of the stone surface). These emulsions are prepared by employing ampholytic emulsifiers and selecting the pH range that will provide the optimum coating of either stone aggregate.

It is, of course, to be understood that the invention as described hereinabove is not limited by the recitals of the particular ampholytic emulsifiers in the description and the illustrative examples, and that all modifications which do not depart from the scope of the invention are to be comprised within the coverage of the attached claims.

I claim:
1. An oil-in-water type paving bituminous emulsion having its pH on the acid side of the neutral point and consisting essentially of from about 50 to about 75% by weight of asphalt; and, as an emulsifier for said asphalt in water, from about 0.15 to about 1.5% by weight of the combination of (1) a cation-active emulsifying salt selected from the group consisting of quaternary ammonium salts of $C_{14}$–$C_{18}$ fatty amines and polyethoxylated $C_{14}$–$C_{18}$ fatty amines and (2) an ampholytic emulsifying salt selected from the group consisting of water-soluble sodium salts of $C_8$–$C_{24}$ alkyl beta-aminopropionic and $C_8$–$C_{24}$ alkyl beta-iminodipropionic acids, the weight ratio of ampholytic emulsifying salt to the cation-active emulsifying salt in this combination being from about 1:6 to about 1:4; and the balance of the emulsion to make 100% by weight being water.

2. An oil-in-water type paving bituminous emulsion as defined in claim 1, wherein the cation-active salt component of the emulsifier is a quaternary ammonium salt of oleylamine ethoxylated with two moles of ethylene oxide, and the ampholytic salt component is a sodium salt of N-lauryl beta-iminodipropionic acid.

References Cited

UNITED STATES PATENTS 1,960,115   5/1934   Loebel _____ 252—311.5
2,706,688   4/1955   Sommer et al. ____ 252—311.5 X

OTHER REFERENCES

Deriphats: Technical Bulletin 12D, published by General Mills, Inc., 1959, pp. 1–3 and 11.

Ethoquad Chemicals: Bulletin No. F-4, published by Armour Industrial Chemical Co., Division of Armour and Co., rec'd. in Pat. Off. May 27, 1964, pp. 1–4.

LEON D. ROSDOL, *Primary Examiner.*

R. D. LOVERING, *Assistant Examiner.*

U.S. Cl. X.R.
106—277